United States Patent [19]

McGillivray

[11] E Re. 29,925

[45] Reissued Mar. 6, 1979

[54] VEHICLE DOOR LATCH

[76] Inventor: Daniel A. McGillivray, 10 Woodchuck Ridge Rd., Rte. 5, Lexington, Va. 24450

[21] Appl. No.: 871,425

[22] Filed: Jan. 23, 1978

Related U.S. Patent Documents

Reissue of:

[64] Patent No.: 3,934,907
Issued: Jan. 27, 1976
Appl. No.: 500,159
Filed: Aug. 23, 1974

[51] Int. Cl.[2] ..... E05C 19/06

[52] U.S. Cl. ..... 292/121; 292/80; 292/83; 292/DIG. 32

[58] Field of Search ..... 292/121, 122, 80, 81, 292/82, 84, 85, 83, DIG. 32

[56] References Cited

U.S. PATENT DOCUMENTS

| | | | |
|---|---|---|---|
| 443,962 | 12/1890 | Golden | 292/82 |
| 823,372 | 6/1906 | Stevens et al. | 292/121 |
| 865,191 | 9/1907 | Lemp | 292/121 |
| 914,179 | 3/1909 | Patterson | 292/80 |
| 1,173,163 | 2/1916 | Behrmann | 292/85 |
| 1,211,284 | 1/1917 | Campbell | 292/DIG. 32 |
| 1,836,611 | 12/1931 | Meyer | 292/80 |
| 2,158,336 | 5/1939 | Madland | 292/DIG. 32 |
| 2,565,636 | 8/1951 | Tinnerman | 292/80 |
| 3,522,963 | 8/1970 | Farnden | 292/83 |

*Primary Examiner*—Victor N. Sakran
*Attorney, Agent, or Firm*—Tilton, Fallon, Lungmus & Chestnut

[57] ABSTRACT

A latch assembly for holding the doors of trucks and other vehicles in open condition, the assembly including a pivotal latch bar having an enlarged free end adapted to be received in the recess of a keeper, and a spring arm having a free end slidably engaging the bar throughout only a portion of the arc of pivotal movement of the bar.

6 Claims, 4 Drawing Figures

10
11
12
13
14
14a
14b
15
16
17
18
19
20
21
22
23
24
25

VEHICLE DOOR LATCH

Matter enclosed in heavy brackets [ ] appears in the original patent but forms no part of this reissue specification; matter printed in italics indicates the additions made by reissue.

BACKGROUND

Latch devices are well known for holding the doors of trucks, trailers, and other vehicles in open condition. Such a latch commonly consists of a latch bar pivotally mounted on a truck body with an enlarged free end receivable in the recess of a door-mounted keeper capable of being swung into close proximity to the latch bar. A need nevertheless exists for a latch assembly which is simple and reliable in structure and operation and which includes some means for insuring that the latch bar will not become accidentally unlatched as the vehicle moves into position adjacent a loading platform, backs through an alleyway, or is shifted relative to any building or object. Should the latch release during such operations, there is a substantial risk that the door will engage the platform, building, or other object and will become crushed, strained, or otherwise damaged. Furthermore, should such contact occur, it is evident that the object engaged by the door might suffer substantial damage.

The following patents are illustrative of the prior art: U.S. Pat. Nos. 3,224,802, 3,625,557, 3,063,745, 3,302,966, 2,802,682 and 2,475,223.

SUMMARY

This invention relates to a strong, durable, and reliable latch equipped with spring means for insuring that the latch bar will remain in its latching position despite movement and possible distortion of the vehicle body on which the latch assembly is mounted. Specifically, the latch includes a leaf spring which is normally untensioned and spaced out of contact with the latch bar. Such spacing not only reduces fatigue of the spring, thereby increasing durability and reliability, but also facilitates grasping of the enlarged free end of the latch bar. Since initial movement of the bar occurs before contact with the spring, and thus without any resistance from the spring, the bar may be easily grasped to commence the lifting movement necessary for a latching operation. As the bar is lifted, the spring slidably engages the shank of the bar to reduce localized wear and to prevent sharp flexure of the spring which might produce spring failure.

Despite the slidable engagement between the bar and the free end of the spring, there is no appreciable danger of disengagement between the parts, even if substantial lateral forces should be exerted against the bar, because of the considerable width of the spring portion engagable with the bar. Stated differently, any forces of sufficient magnitude to shift the bar laterally out of engagement with the spring would be of such magnitude as to cause permanent damage or destruction to the latch assembly as a whole, requiring replacement of that assembly.

DRAWINGS

DESCRIPTION

Figures 1, 2, 3, 4:
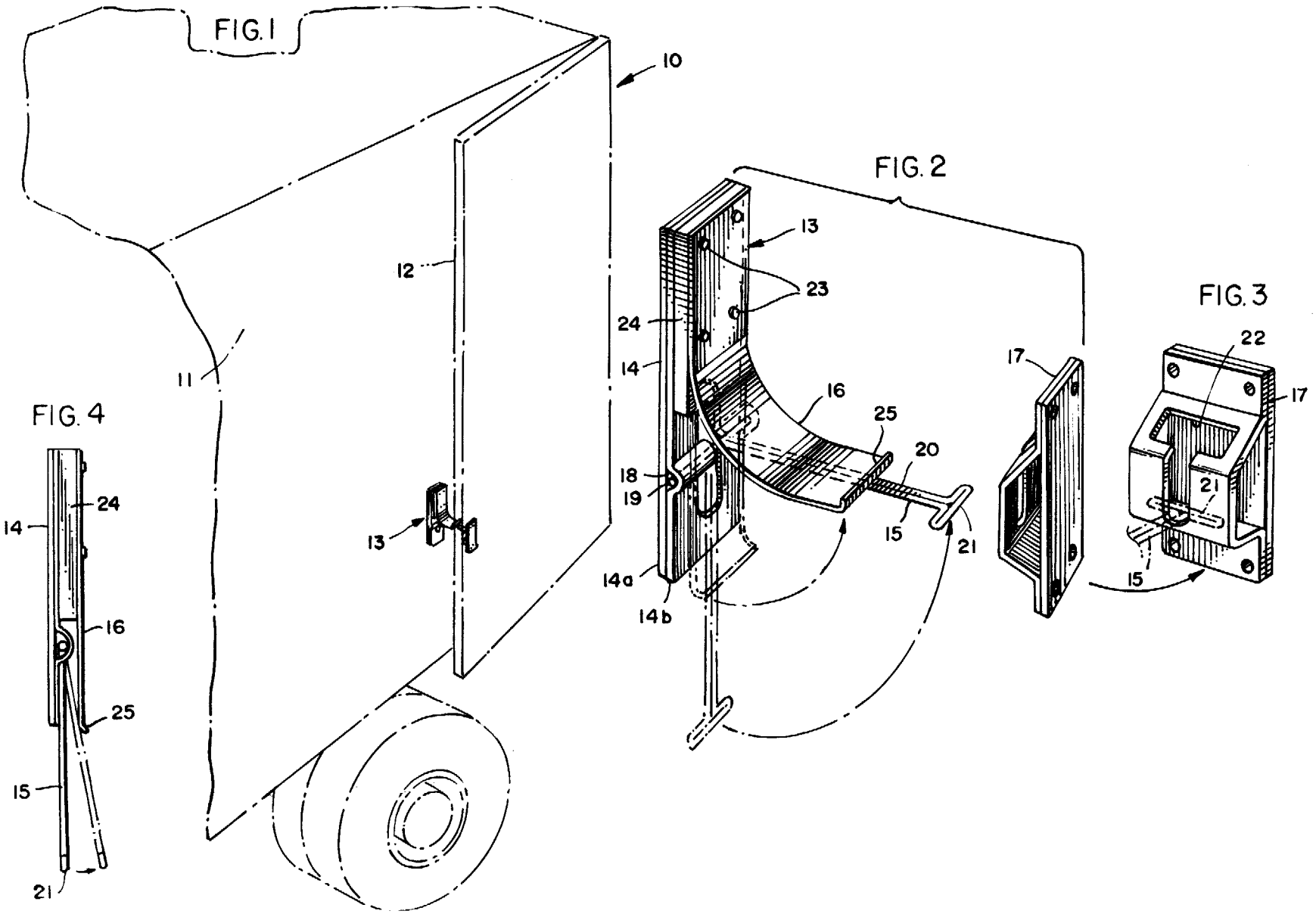
FIG. 1 is a perspective view of a latch assembly in latched condition, the assembly being illustrated in relation to a truck body represented in phantom.
FIG. 2 is an enlarged perspective view of the latch assembly showing the latch bar in raised condition but out of engagement with the keeper. The position of the latch bar in released condition is illustrated in phantom.
FIG. 3 is another perspective view of the keeper.
FIG. 4 is a side elevational view of the latch illustrating the range of movement of the latch bar before flexing of the spring occurs.

In the drawings, the numeral 10 generally designates a vehicle, such as a truck or trailer, having a body portion 11 and doors 12, only one of such doors being shown. A latch assembly 13 is provided to hold each door in its open condition. The assembly, depicted most clearly in FIG. 2, comprises a mounting plate 14, a latch bar 15, a latch-biasing spring 16, and a keeper 17.

For simplicity of manufacture, plate 14 may consist of inner and outer plate members 14a and 14b, the outer member 14b being formed to define transverse horizontal openings 18 for pivotally receiving the laterally projecting fingers 19 at the inner end of the latch bar. The bar itself may be machined from solid stock although, in the preferred embodiment illustrated, the bar is bent from cylindrical stock or heavy wire. In any event, the bar is provided with an elongated shank portion 20, an enlarged head portion 21 at the bar's free end, and the laterally projecting pivot fingers or pins 19 previously described.

The enlarged free end portion 21 of the bar is adapted to be received in a T-shaped slot 22 in keeper 17 (FIG. 3). The keeper is intended to be mounted on door 12, and the latch plate on body 11, as illustrated in FIG. 1; however, if desired, the orientation may be reversed with the keeper mounted on the body and the mounting plate affixed to the door.

The structure so far described, exclusive of spring 16 and its cooperative relationship with latch bar 15, is generally conventional. Spring 16 takes the form of a flat leaf spring which, in an untensioned state, extends in a vertical plane parallel with mounting plate 14. The upper portion of the spring is secured by rivets 23 or by any other suitable means to the upper portion of plate 14. It will be observed, however, that a spacer or shim 24 is interposed between the upper portions of the spring and plate with the result that the lower portion of the spring is spaced a substantial distance outwardly from the plate and the unlatched bar 15 (FIG. 4). By reason of such spacing, the free end 21 of the latch bar 15 may be swung outwardly a substantial distance before engagement between the bar and spring occurs, as illustrated most clearly in FIG. 4. In general, the extent of such free movement should fall within the range of approximately 2° to 20°, the particular angle illustrated in the drawings being approximately 10 degrees. Because the spring and bar do not normally engage each other when the bar is unlatched, the spring is normally in an untensioned or unstressed condition. Of particular significance is the fact that the limited distance of free movement of the bar permits a user to slip his fingers behind the bar, urging it outwardly into the broken line position illustrated in FIG. 4 without resistance from the spring, until he is able to obtain a secure grip on the latch bar and raise it into its latching position.

As the bar is raised, the free lower end of the spring arm slidably engages the shank 20 of the bar and urges the bar downwardly in opposition to the lifting force applied by the user. It is believed evident that when the free end 21 of the bar is received within the T-shaped slot of the keeper 17, spring arm 16 will firmly maintain the bar in its latched position.

It is to be noted that the free end of the spring arm is curved outwardly at 25 to provide a rounded surface for slidably engaging the latch bar (FIG. 4). In addition, the spring arm is of considerable width, substantially wider than the shank portion of arm 15 which it slidably engages. Specifically, the spring arm should be at least twice as wide, and as much as 10 times as wide, as the bar's shank portion. Therefore, even if lateral forces of substantial magnitude are exerted against arm 15 in its latched condition, as where distorting forces are applied to door 12 or forces sufficient to rack body 11 are developed, spring 16 will nevertheless remain in contact with the latch bar to hold that bar in its latching position.

While in the foregoing I have disclosed an embodiment of the invention in considerable detail for purposes of illustration, it will be understood by those skilled in the art that many of these details may be varied without departing from the spirit and scope of the invention.

I claim:

1. A latch assembly including a mounting plate adapted to be affixed to a vertical surface, a normally vertical latch bar having an upper end pivotally attached to the plate for outward swinging movement of the bar in a vertical plane normal to the plate, the bar having an opposite free end adapted to be detachably received in the recess of a keeper, wherein the improvement comprises a vertically-elongated spring arm [having an upper end secured to said plate above the pivotal attachment of said bar to said plate] *supported upon said plate* and having a lower end slidably engagable with said bar for yieldably resisting lifting movement of the bar's free end and for retaining said free end within the recess of said keeper, said spring arm being substantially wider than the portion of said bar in slidable engagement therewith and having its free end curved away from said bar, said spring arm in an untensioned state having its lower end spaced outwardly from said bar in the direction of pivotal movement of said bar, whereby, said bar may be grasped and swung outwardly a limited distance of free movement before slidably engaging said spring arm.

2. The assembly of claim 1 in which the limited distance of free movement comprises an arc within the range of 2° to 20°.

3. The assembly of claim 2 in which said arc is approximately 10°.

4. The assembly of claim 1 in which a spacer is interposed between the upper end of said spring and said mounting plate.

5. The assembly of claim 1 in which the width of said spring is about 2 to 10 times the width of the bar portion slidably engagable therewith.

*6. The assembly of claim 1 in which said spring arm has an upper end secured to said plate substantially above the pivotal attachment of said bar to said plate.*

* * * * *